(12) United States Patent
Lautenschläger

(10) Patent No.: US 7,340,022 B2
(45) Date of Patent: Mar. 4, 2008

(54) METHOD, A SENDER, A RECEIVER, AN OPTICAL NETWORK ELEMENT AND A SERIALIZED PACKET FORMAT FOR TRANSMITTING PACKETS

(75) Inventor: Wolfram Lautenschläger, Sachsenheim (DE)

(73) Assignee: Alcatel, Paris (FR)

( * ) Notice: Subject to any disclaimer, the term of this patent is extended or adjusted under 35 U.S.C. 154(b) by 659 days.

(21) Appl. No.: 10/773,168

(22) Filed: Feb. 9, 2004

(65) Prior Publication Data
US 2004/0170242 A1    Sep. 2, 2004

(30) Foreign Application Priority Data
Feb. 28, 2003    (EP) ................... 03290481

(51) Int. Cl.
*H04L 7/00*    (2006.01)
(52) U.S. Cl. ...................... 375/354; 375/356
(58) Field of Classification Search ............... 375/265, 375/260, 259, 316, 282, 356, 361, 368, 354
See application file for complete search history.

(56) References Cited

U.S. PATENT DOCUMENTS

| | | | |
|---|---|---|---|
| 6,064,705 A | | 5/2000 | Zalud et al. |
| 6,185,717 B1* | | 2/2001 | Fukunaga et al. ........... 714/777 |
| 2001/0055322 A1* | | 12/2001 | Domon ........................ 370/537 |
| 2002/0075979 A1* | | 6/2002 | Wheatley .................... 375/368 |
| 2002/0101944 A1 | | 8/2002 | Schabel et al. |
| 2004/0136455 A1* | | 7/2004 | Akhter et al. ................ 375/240 |

FOREIGN PATENT DOCUMENTS

| | | |
|---|---|---|
| EP | 1 221 781 A2 | 7/2002 |
| WO | WO 99/26364 | 5/1999 |

OTHER PUBLICATIONS

M. Mouly et al, "The GSM System for Mobile Communications", 1992, Cell & Sys., 4 rue Elisee Reclus, F-91120 Palaiseau, France XP002247807, pp. 231-248.
Patent Abstracts of Japan, vol. 015, No. 114 Mar. 19, 1991, corresponding to JP 03 006142 A (Kenwood Corp.) dated Jan. 11, 1991.

* cited by examiner

*Primary Examiner*—Emmanuel Bayard
(74) *Attorney, Agent, or Firm*—Sughrue Mion, PLLC

(57) ABSTRACT

The present invention relates to a method for transmitting packets comprising a synchronization part (sync') and a payload part (dat1, dat2), wherein the transmission format comprises a shortened synchronization part (syn') and the payload part is split into a first data sequence (dat1), encoded in the first encoding, followed by the second data sequence (dat2), encoded in the second encoding, comprising the steps of encoding and sending the first data sequence (dat1) in the first encoding, encoding and sending the second data sequence (dat2) in the second encoding, on the sender side and receiving and decoding the first data sequence (dat1) in the first encoding, detecting the end of the first data sequence and adapting the receiver's decoder, receiving and decoding the second data sequence (dat2) in the second encoding on the receiver side. The invention further relates to a sender, a receiver, an optical network element, and a serialized packet format.

9 Claims, 6 Drawing Sheets

Figure 1, Background

Figure 2, Prior Art

METHOD, A SENDER, A RECEIVER, AN OPTICAL NETWORK ELEMENT AND A SERIALIZED PACKET FORMAT FOR TRANSMITTING PACKETS

TECHNICAL FIELD

The invention relates to a method for transmitting packets comprising a synchronization part and a payload part.

The invention is based on a priority application, EP 03290481.5, which is hereby incorporated by reference.

BACKGROUND OF THE INVENTION

A method is known from U.S. Pat. No. 6,064,705 disclosing an encoding system using transmission packets including a start of frame followed by the coded data value followed by the end of frame where the start of packet encoding and the end of packet encoding is different from the data value encoding.

Optical networks face increasing bandwidth demands and diminishing fiber availability. Based on the emergence of the optical layer in transport network optical networks provide higher capacity and reduced cost. As with any new technology, many challenges arise. Bit synchronization and power adaptation at when receiving packetized data require a bit synchronization sequence. This necessity of a bit synchronization sequence results in a limitation in throughput and/or in flexibility when transmitting short packets like Internet packets.

For transmitting serialized packetized data an encoding is necessary. This encoding should be suited to encode data compact as well as suited for the data transport layer down through the physical layer, i.e. the optical medium and the used components.

Such a method of transmitting serialized packetized data is known from Mouly and Pautet, "The GSM System for Mobile Communications", 1992, CELL & SYS., pages 231-248, where a normal burst is described containing two packets surrounding a training (or synchronization) sequence. The transmitting of NR7 bit train by converting it to synchronizing data is known from PATENT ABSTRACTS OF JAPAN Vol. 015, No. 114 (E-1047) and JP 03 006142 A.

Non-return to zero encoding (NRZ) is commonly used in slow speed communications interfaces for both synchronous and asynchronous transmission. Using NRZ, a logic 1 bit is sent as a high value and a logic 0 bit is sent as a low value, illustrated in FIG. 1.

A problem arises when using NRZ to encode a synchronous link which may have long runs of consecutive bits with the same value. In Ethernet for example, there is no control over the number of 1's or 0's which may sent consecutively. There could potentially be thousands of 1's or 0's in sequence. If the encoded data contains long 'runs' of logic 1's or 0's, this does not result in any bit transitions. The lack of transitions prevents the receiver from reliably regenerating the clock making it impossible to detect the boundaries of the received bits at the receiver. This is the reason why Manchester coding is used e.g. in Ethernet LANs.

Manchester encoding is a synchronous clock encoding technique often used in the physical layer to encode the clock and data of a synchronous bit stream. In this technique, the actual binary data to be transmitted are not sent as a sequence of logic 1's and 0's. Instead, the bits are translated into a slightly different format that has a number of advantages over using straight binary encoding. Manchester encoding follows the rule that an original logic 0 is encoded by a 0 to 1 change (upward transition at bit center), and a logic 1 is encoded by a 1 to 0 change (downward transition at bit center).

The diagram in the background teaching FIG. 1 shows a time diagram where the bit sequence 1,1,0,1,0,0,1,1 is in the upper part A Manchester encoded and NRZ encoded in the lower part B.

Manchester encoding may be alternatively viewed as a phase encoding where each bit is encoded by a positive 90 degree phase transition, or a negative 90 degree phase transition. The Manchester code is therefore also known as a Bi-phase Code.

A Manchester encoded signal contains frequent level transitions which allow the receiver to extract the clock signal using e.g. a digital phase locked loop (DPLL) and correctly decode the value and timing of each bit. To allow reliable operation using a DPLL, the transmitted bit stream must contain a high density of bit transitions. Manchester encoding ensures this, allowing the receiving DPLL to correctly extract the clock signal.

The penalty for introducing frequent transitions, is that the Manchester coded signal consumes more bandwidth than the NRZ encoded signal. For a 10 Mbps LAN, the signal spectrum lies between the 5 and 10 MHz.

Manchester encoding is used as the physical layer of an Ethernet LAN, where the additional bandwidth is not a significant issue. For example the pattern of bits 0, 1, 1, 1, 1, 0, 0, 1 encodes to 01, 10, 10, 10, 10, 01, 01, 10. Another more curious example is the pattern 1, 0, 1, 0, 1 which encodes to 10, 01, 10, 01, 10 which could also be viewed as "1 00 11 00 11 0". Thus for a 10 Mbps Ethernet LAN, the preamble sequence encodes to a 5 MHz square wave i.e., one half cycle in each 0.1 microsecond bit period.

Line coding is a process of modifying a source signal to facilitate proper signal reception in the presence of transmission impairments. In optical systems employing optical intensity modulation, the required features of line codes are bit sequence independence, small low frequency content, transmission of adequate timing information, high efficiency, low error multiplication, and low systematic jitter etc. Since currently all practical systems employ optical intensity modulation, the line code is essentially uni-polar. In fiber-optic transmission, binary line codes are preferred to multilevel codes due to the inherent non-linearity of the optical media.

A typical optical transmitter consists of a digital device providing the data or payload. The data is encoded and serialized for driving a laser or modulator to get a modulated laser beam, i.e. serialization and electrical-to-optical conversion.

Emphasis is directed to the fact, that the serialized data has an upper frequency bound, which might be on the limit of the underlying technology, and that an extension of this limit would cause an intolerable increase of cost.

The receiver reverses this operation, i.e. optical-to-electrical conversion and de-serialization, with similar limitations, i.e. the speed limit of the participating components.

The invention acts on the preamble of the independent method claim for transmitting packets having a synchronization part and a payload part, sending a synchronization part, detecting the synchronization part and synchronizing and adapting the receiver for receiving the payload part.

In burst mode, i.e. when multiple packets with random length and of random arrival time are transmitted, the receiver is faced with two adaptation requirements:

(a) a fast adaptation to different power levels from packet to packet and
(b) a fast adaptation to different bit clock phases from packet to packet.

Both requirements result in a transient with for a certain transient time, for both amplitude as well as for bit phase. At the beginning of each packet, during the transient, a receiver is not able to interpret received data correct. To cope with this fact, a bit synchronization sequence in front of the packet is needed to absorb the transient before arrival of any relevant data bit.

The transients in the receiver have lower bounds. It has to be large enough not causing transients by regular data patterns. There is a relationship between data rate, transient times, and the length of bit synchronization sequence.

The bit synchronization sequence is lost in terms of throughput, and when it is of fix length, the smaller the packets the larger the percentage of loss.

To overcome this dilemma two solutions are known:
(1) Do a rigid line coding of the whole data packet, which is alternating (DC free) even for a small number of bits, e.g. Manchester coding. This would allow to reduce the transient time to a minimum, for the price of loosing half of the data rate.
(2) A variable (or switchable) transient time. Short transient during bit synchronization sequence, but long hold time during the data packet. The change of transient time needs to be completed within the timeframe of the bit synchronization sequence resulting in a new timing constraint: The change or switch of transient time is initiated by a start of packet detector. Hence the bit synchronization sequence cannot be shorter than the delay in the start of packet detection path.

There is already a solution available concerning the clock recovery and for adapting the amplitude level, e.g. European patent application EP 1 221 781.

The change of the transient time needs to be completed within the timeframe of the bit synchronization sequence, producing a new timing limitation. The change or switch of the transient time is initiated by a detector recognizing the start of a packet. That is the reason why the bit synchronization sequence cannot be shorter than the delay in the start of packet detection path.

This invention targets the problem of improving the (asynchronous and synchronous) coding tradeoff for burst transmission and burst switching. Bit synchronization and power adaptation at packet start require a bit synchronization sequence. The necessity of a bit synchronization sequence results in a limitation in throughput and/or in flexibility when transmitting short packets.

Using Manchester coding or other strong line coding, having the disadvantage of loosing about half of the data rate, if the bandwidth is fix. The observation is that strong line coding seems to be well suited for small packets, where the switching is the major target.

Switchable timing of the receiver, having the disadvantage of a control signal for the time constant switch causing a timing limitation for the bit synchronization sequence. This is good for large packets, where the throughput is major target.

These problems and restrictions are overcome by a method for transmitting packets comprising a synchronization part and a payload part, comprising the steps of sending a synchronization part using a first encoding, encoding and sending the payload part using a second encoding, on the sender side and detecting the synchronization part in the first coding and synchronizing and adapting the receiver and decoder, receiving and decoding the payload part in the second encoding on the receiver side, wherein the transmission format comprises a shortened synchronization part and the payload part is split into a first data sequence, encoded in the first encoding, followed by the second data sequence, encoded in the second encoding, comprising further interleaved steps of encoding and sending the first data sequence in the first encoding, encoding and sending the second data sequence in the second encoding, on the sender side and receiving and decoding the first data sequence in the first encoding, detecting the end of the first data sequence and adapting the decoder, receiving and decoding the second data sequence in the second encoding on the receiver side. The first data sequence might be encoded in a line coding enabling a synchronization in the receiver. And this first data sequence might be Manchester encoded. The second data sequence might be non-return-to-zero encoded. The adaptation and the decoding might be depended on the received signal pattern or might be time depended. The second encoding might comprises further encodings.

These problems and restrictions are overcome by a sender for transmitting packets comprising a synchronization part and a payload part, the sender comprising a serialization unit for serialization data and an encoding unit for encoding said serialized data, wherein said serialization unit comprising a synchronization unit for generating the synchronization part and an encoding unit for generating a first data sequence, encoded in a first coding, comprising a reserve part, followed by the second data sequence, encoded in a second coding.

Correspondingly these problems and restrictions are overcome by a Receiver for transmitting packets comprising a synchronization part (sync') and a payload part, said receiver comprising a detector unit for detecting a synchronization part, a control unit for adapting the receiver characteristics, wherein according to said detected synchronization part, a receiver unit for decoding a first data sequence, encoded in a first encoding, said detector unit detecting the end of said first data sequence, said control unit adapting the receiver's decoding, and said receiver unit for decoding a second data sequence, encoded in a second encoding.

These problems and restrictions are furthermore overcome by an Optical Networking Element for transmitting packets comprising a synchronization part and a payload part, said optical networking element comprising a sender comprising a serialization unit for serialization data, an encoding unit for encoding said serialized data, wherein the serialization unit comprising a synchronization unit for generating a synchronization part and an encoding unit for generating a first data sequence, encoded in a first coding, comprising a reserve part, followed by the second data sequence, encoded in a second coding.

And these problems and restrictions are overcome by an Optical Networking Element for transmitting packets comprising a synchronization part (sync') and a payload part, said optical networking element comprising a receiver comprising a detector unit for detecting a synchronization part, a control unit for adapting the receiver characteristics, wherein according to said detected synchronization part, a receiver unit for decoding a first data sequence, encoded in a first encoding, said detector unit detecting the end of said first data sequence, said control unit adapting the receiver's decoding, and said receiver unit for decoding a second data sequence, encoded in a second encoding.

These problems and restrictions are overcome by a Serialized Packet Format for transmitting packets comprising a synchronization part and a payload part, wherein a first data sequence in a first coding and, separated, a second data sequence encoded in a second coding. The first data sequence might be Manchester encoded and the second data sequence might be non-return-to-zero encoded.

SUMMARY OF THE INVENTION

Accordingly, it is an object and advantage of the present invention to provide coding schema for optical packet transmission allowing a receiver adaptation for non-burst transmission and a burst transmission at a low cost of bandwidth.

It is an object and advantage of the present invention for transmitting very short packets, e.g. TCP/IP ACK packets, the throughput is at least close to half of the bit rate. These packets will be transmitted completely e.g. in Manchester coding.

Another advantage of the present invention is to transmit very long packets or even infinitary packets with a throughput that is close to the bit rate, as after the initial parts the rest of the packet is e.g. NRZ-encoded.

A further advantage of the present invention is that the control path time delay and the corresponding robustness reserve for this delay are no more in the critical path for the first relevant data bits. Even packets shorter than this delay time can be received.

These and many other objects and advantages of the present invention will become apparent to those of ordinary skill in the art from a consideration of the drawings and ensuing description.

In other words the invention is to use multiple encodings, one for a trailer and one for the rest. The invention is a packet format comprising a very short bit synchronization sequence, followed by e.g., Manchester encoded data for a certain timeframe, necessary to do the timing switching, and followed by the rest of the data, e.g. in normal NRZ coding.

The Manchester coding of the first section is preferably to be performed in a way, that one Manchester coded bit is mapped into a timeframe of 2 bits of the normal NRZ signal.

The Manchester coding can be done in the digital device at low bit rates. Hence there is no need for coding operations in the high frequency part. The upper frequency bound of the sequential signal is the same for both the Manchester coded as well as the NRZ coded part. Hence there is no need for bandwidth extension.

The Manchester coded section is nearly free of lower frequency components. This allows for short time constants in the receiver for the bit synchronization sequence and the during the Manchester coded data section. Hence no need for time critical switch of time constants before any relevant data bit. The benefit is paid by only the half throughput compared to the bit rate during the trailer transmission.

The switch of the timing, compared to the bit rate, is rather a smooth transit. For its implementation are not only sample and hold gates available but also gain controlled amplifiers etc.

DETAILED DESCRIPTION OF THE INVENTION

Figure 1:
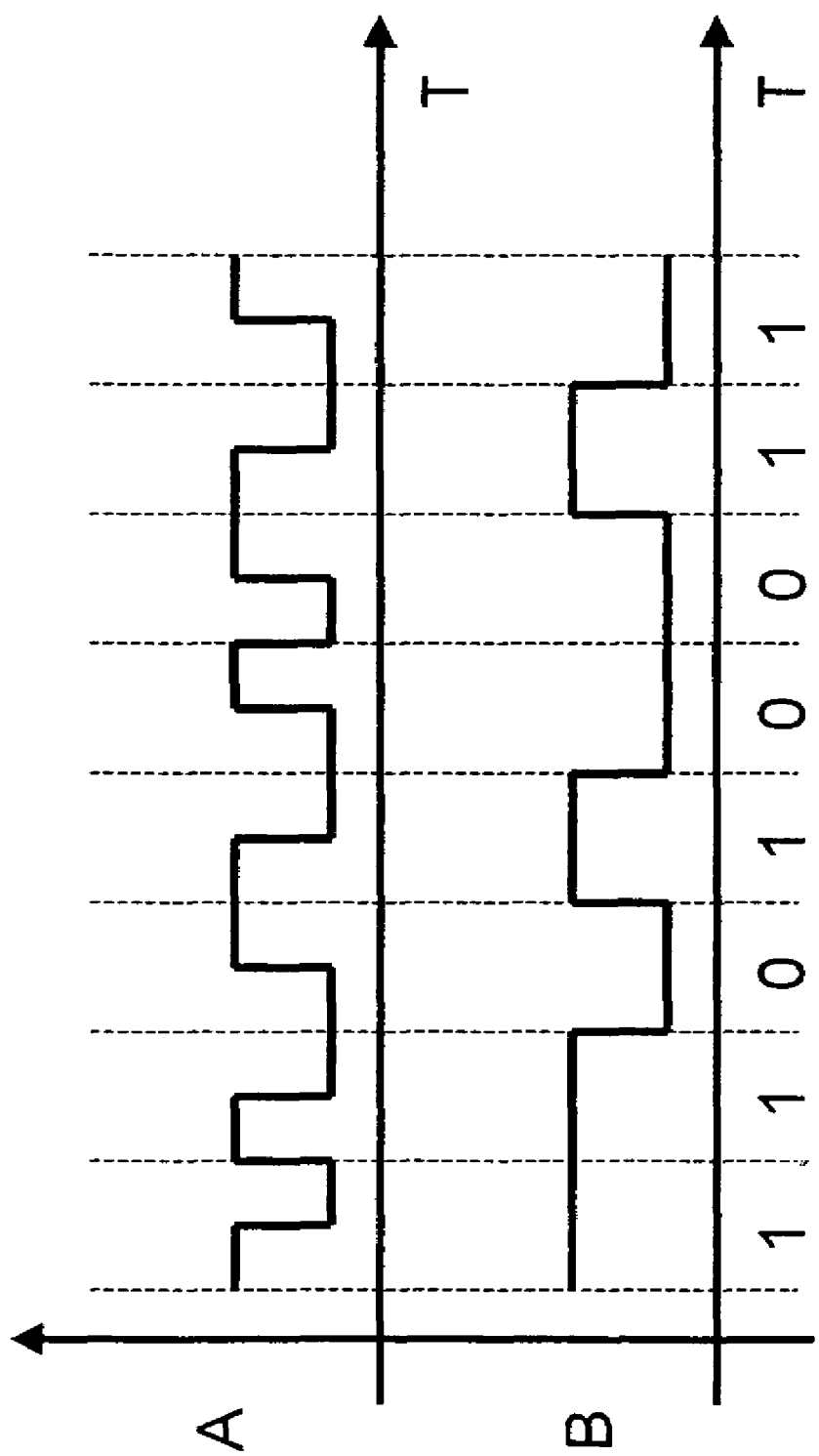
FIG. 1 is a schematic drawing illustrating the coding background.
Figure 2:
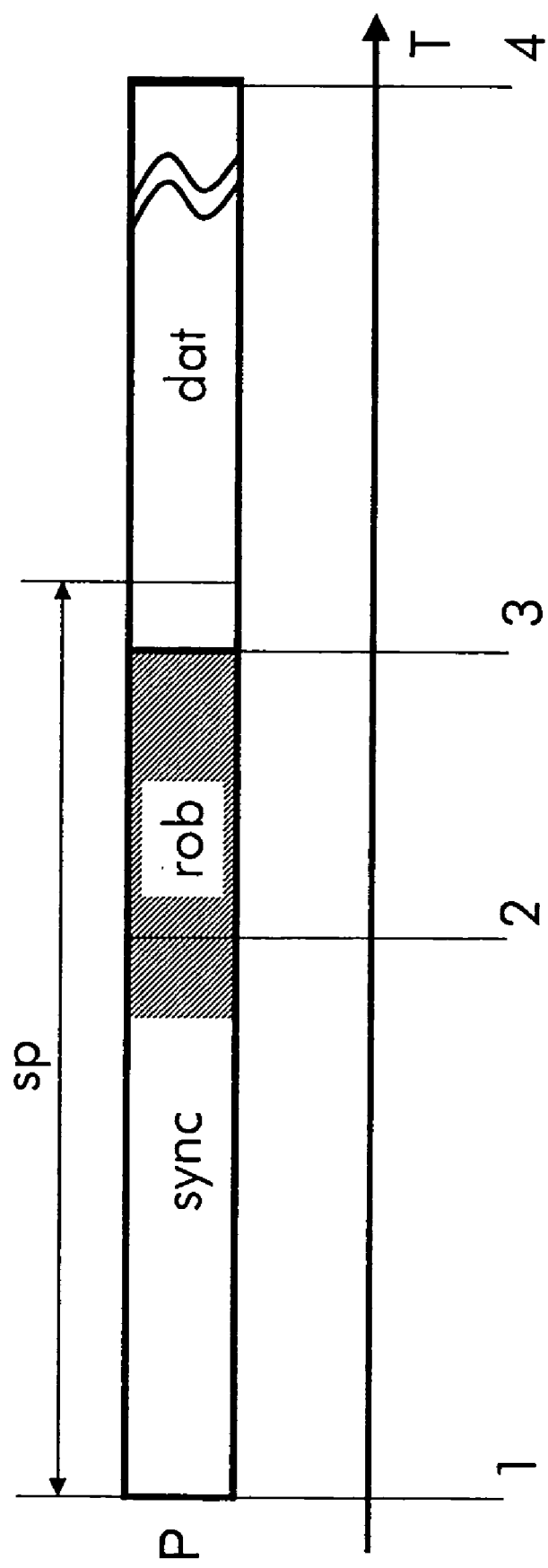
FIG. 2 is a timing diagram illustrating the structure and the receiving process of a serialized packet format according to prior art.

FIG. 2 shows a serialized packet P over the time axis T. The serialized packet P comprises a bit synchronization sequence sync comprising a robustness reserve rob, and a data sequence dat, e.g. header and payload of an Internet packet.

The packet receiving process is illustrated by the numeric labels 1,2,3,4 on the time axis T corresponding to times. At the first label 1 the serialized packet arrives at the receiver. Within the bit synchronization sequence the receiver detects the start of the packet P and derives the signal characteristics, e.g. phase, clock, and intensity. Within the time interval spanned by the bit synchronization sequence sync and the robustness reserve rob, in the example at the second label 2 the receiver has adapted or is calibrated to the signal characteristics, e.g. the timing of the receiver. The adapting has to be finished at the third label 3 when the data sequence dat starts. Then the receiver has to encode the transmitted data until the packet ends, at the fourth label 4.

The figure further illustrates the shortest possible packet by the arrow labels sp, comprising the bit synchronization sequence sync, the robustness reserve and a small data sequence.

Figure 3:
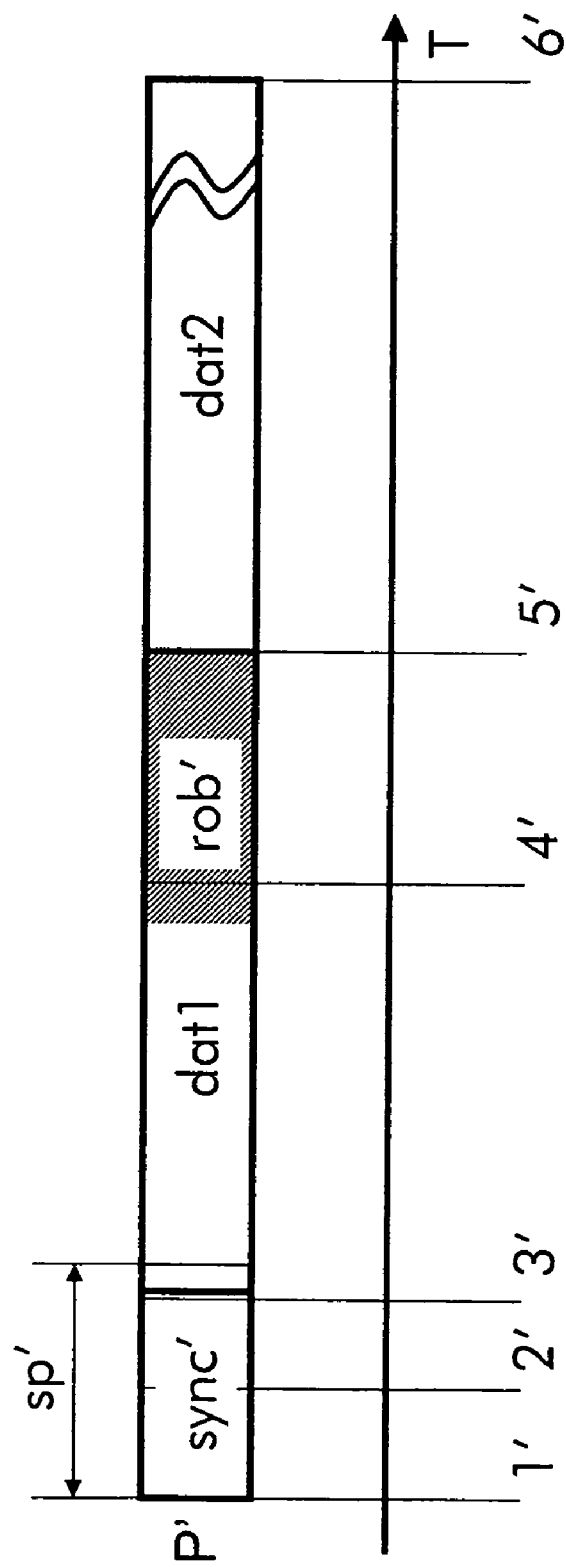
FIG. 3 is a timing diagram illustrating the structure and the receiving process of a serialized packet format according to the invention.

FIG. 3 shows a serialized packet P' over the time axis T according to the invention. The serialized packet P' comprises a bit synchronization sequence sync', followed by a first data sequence dat1 comprising a robustness reserve rob', and followed by a second data sequence dat2.

The packet receiving process is illustrated by the numeric labels 1', 2', 3', 4', 5', and 6' on the time axis T corresponding to time stamps. At the first label 1 the serialized packet arrives at a receiver. Within the bit synchronization sequence the receiver detects the start of the packet P' and adapts to the signal characteristics, e.g. phase, clock, and intensity, encoding, etc. Within the time interval spanned by the bit synchronization sequence sync', in the example at the second label 2' the receiver has adapted according to the signal characteristics, e.g. the timing of the receiver etc. A lazy adapting has to be finished at the third label 3' when the first data sequence dat1 starts. Then the receiver has the to encode the transmitted data until the first data sequence dat1 ends at label 5'. Within this interval the receiver might further adapt characteristics, enabled by the coding of dat1. Within the time interval spanned by the robustness reserve rob' the receiver has to be adapted on the receiving characteristics, in the example at label 4', say. At label 5', when the second data sequence begins and the receiver (note that at this point the receiver is already synchronized) starts encoding the second data sequence dat2 until the packet ends, at label 6'.

The figure further illustrates the shortest possible packet by the arrow labels sp', comprising the bit synchronization sequence sync', a small first data sequence dat1.

Figure 4:
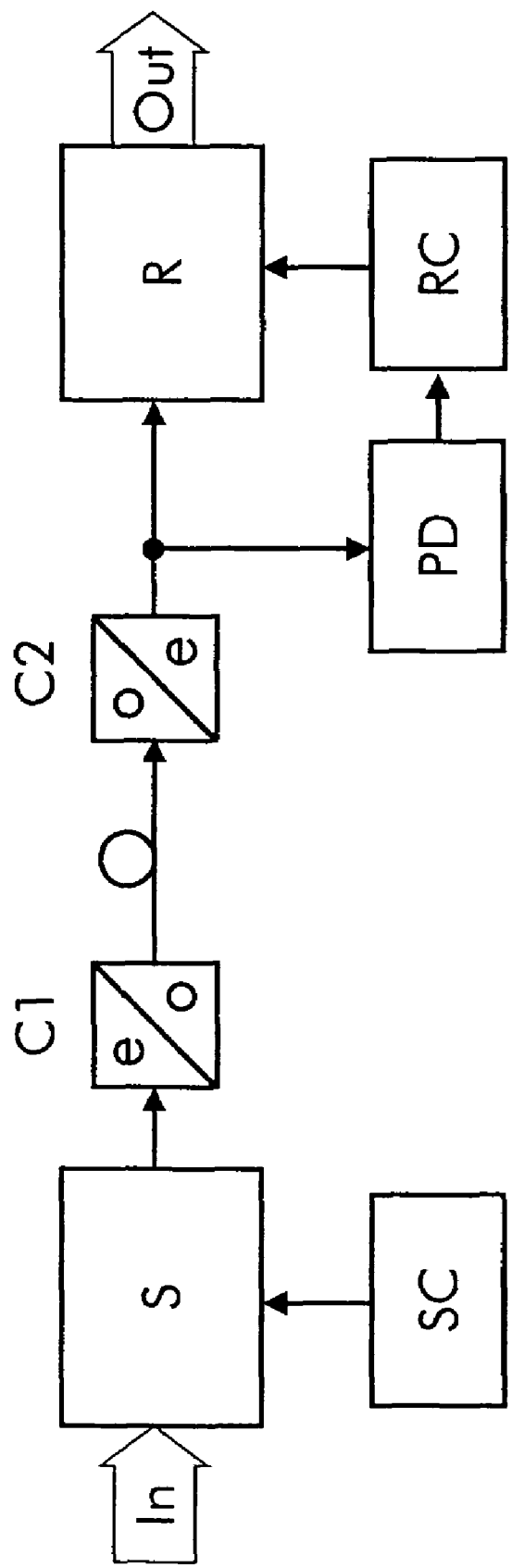
FIG. 4 is a schematic drawing of a sender and receiver according to the invention.

FIG. 4 shows a schematic drawing of a optical transmission system comprising a sending unit S, a sender control unit SC, an electrical-to-optical converter C1, an optical-toelectrical converter C2, a receiving unit R, a packet detector unit PD, and a receiver control unit RC.

The sending unit S has to encode a sending data stream IN into signals driving the electrical-to-optical converter C1. Therefore the sending unit S needs to be controlled by the sender control unit SC instructing the sender e.g. how to encode a data packet, i.e. translating a piece of data into a deliver format as described in FIG. 3. The electrical-to-optical converter C1 translates the signal into an optical signal which is the transmitted to the optical-to-electrical converter C2. The optical-to-electrical converter C2 translates the received optical signal, changed by transport phenomena like chromatic dispersion and attenuation, into an electrical signal for the receiving unit R. To cope with the transport phenomena the receiver needs to interpret the electrical signal in such a way that the original piece of data is reconstructed and delivered through a receiving data stream OUT. Hence the receiver and the sender need to share an encoding schema. Using the serialized packet format described in FIG. 3 enables the packet detector unit PD recognizing the start of a packet sequence. The packet detector unit PD informs the receiver control unit RC about a packet start event and signal deformations, e.g. by analyzing the synchronization sequence seq' described in FIG. 3. Hence the receiver control unit RC is enabled to control the receiving unit, e.g. adapting timing, amplitude level(s), phase shift, etc., and especially the de-coding accordingly. In the serialized packet format shown in FIG. 3, with this system architecture the control unit is especially enabled to adapt the decoding at the time labels 2' and 5' ensuring that the first data sequence dat1 is decoded using a first decoding and the second data sequence dat2 is decoded using a second decoding.

Figure 5:
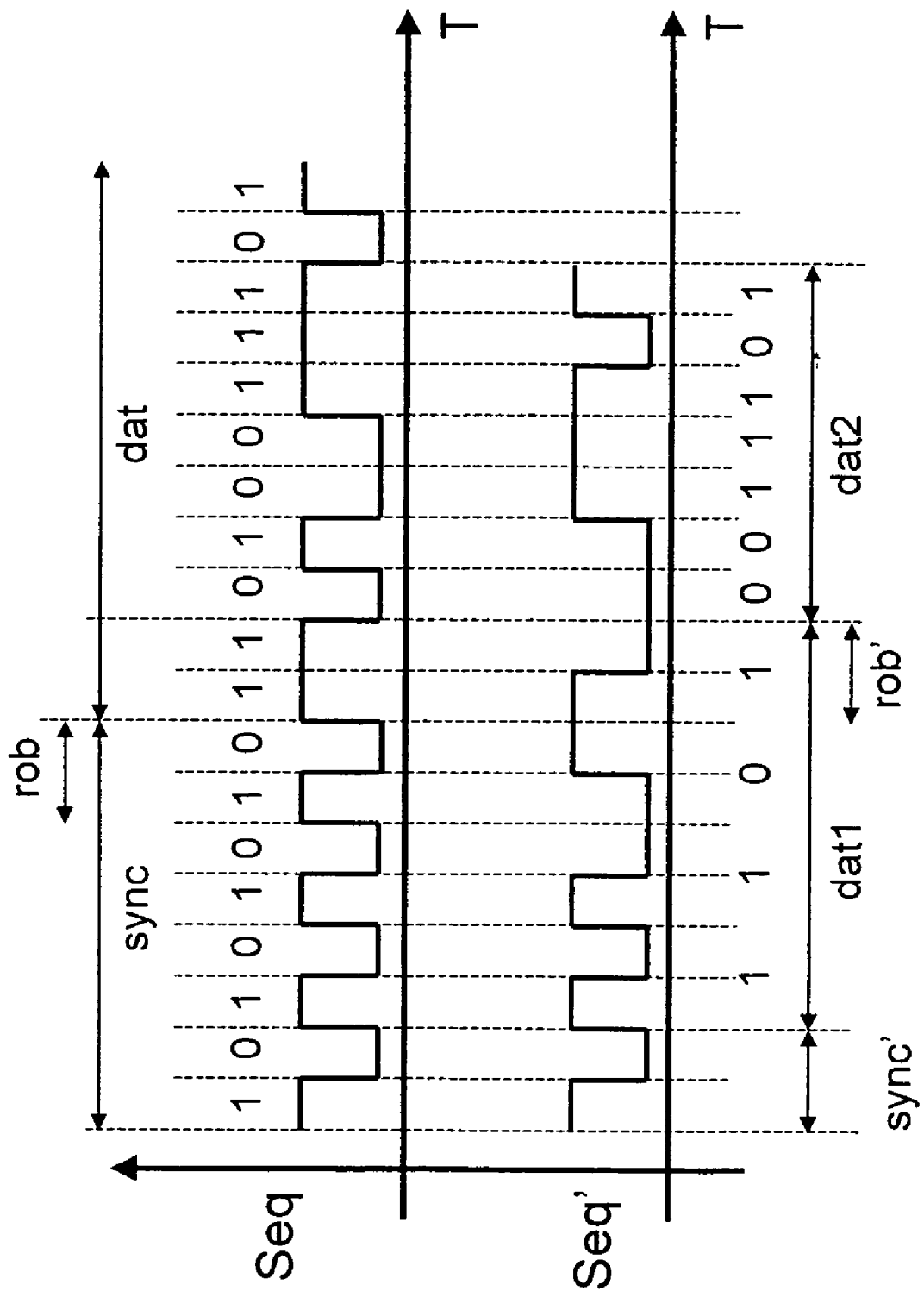
FIG. 5 is a spectral power characteristics diagram illustrating the advantage of the invention.

FIG. 5 shows a timing diagram comparing the encoding of a sample data sequence 1,1,0,1,0,0,1,1,1,0,1 using the serialized packet formats described in FIG. 2 and FIG. 3. The synchronization sequence 1,0,1,0,1,0,1,0 is assumed.

The upper part of the time diagram shows a plain non-return to zero encoding according to the description of FIG. 2. The time axis T is divided into sections indicated by vertical dashed lines. Within one section the non-return to zero encoding encoded signal is constant high or low. The resulting signal Seq has a synchronization sequence (prefix) sync consisting of four alternating consecutive high section low section pairs. This synchronization sequence (prefix) sync comprises a robustness reserve rob, and is followed by the data sequence dot encoded into the section level sequence high, high, low, high, low, low, high, high, high, low, high.

According to the rule that an '1' is translated into high section and a '0' is translated into low section.

The lower part of the time diagram shows an encoding according to the description of FIG. 3, i.e. a application of the invention. As in the upper part the time axis T is divided into sections indicated by the vertical dashed lines. In this example the synchronization sequence sync' and the first data sequence dat1, e.g. a packet header, is Manchester encoded where one coding section for one bit comprises two timing sections. The resulting signal Seq' has a shortened synchronization sequence (prefix) sync' consisting of two alternating consecutive sections. This synchronization sequence (prefix) sync' is followed by the first data sequence dat1 comprising the bit sequence 1,1,0,1 in Manchester encoding, i.e.

falling edge section, falling edge section, raising edge section, falling edge section.

The first data sequence dat1 comprises a robustness reserve rob', and is followed by a second data sequence dat2 encoded into the section level sequence low, low, high, high, high, low, high, according to the non-return to zero encoding.

The diagram illustrates the advantages of the invention, namely that short packets are faster transmitted. The Manchester coding of the prefix is performed such that a Manchester coded bit is mapped into a two sections or timeframe of 2 bits of the non-return to zero coded part. This coding schema especially has following advantageous features: The Manchester coding can be done in the digital device at low bit rates. The upper frequency bound of the sequential signal is the same for both the Manchester coded as well as the NRZ coded part. The Manchester coded section is nearly free of lower frequency components. This allows for short time constants in the receiver not only during the bit synchronization sequence but also during the Manchester coded data section. The benefit costs only the half throughput compared to the bit rate during the header section.

Figure 6:
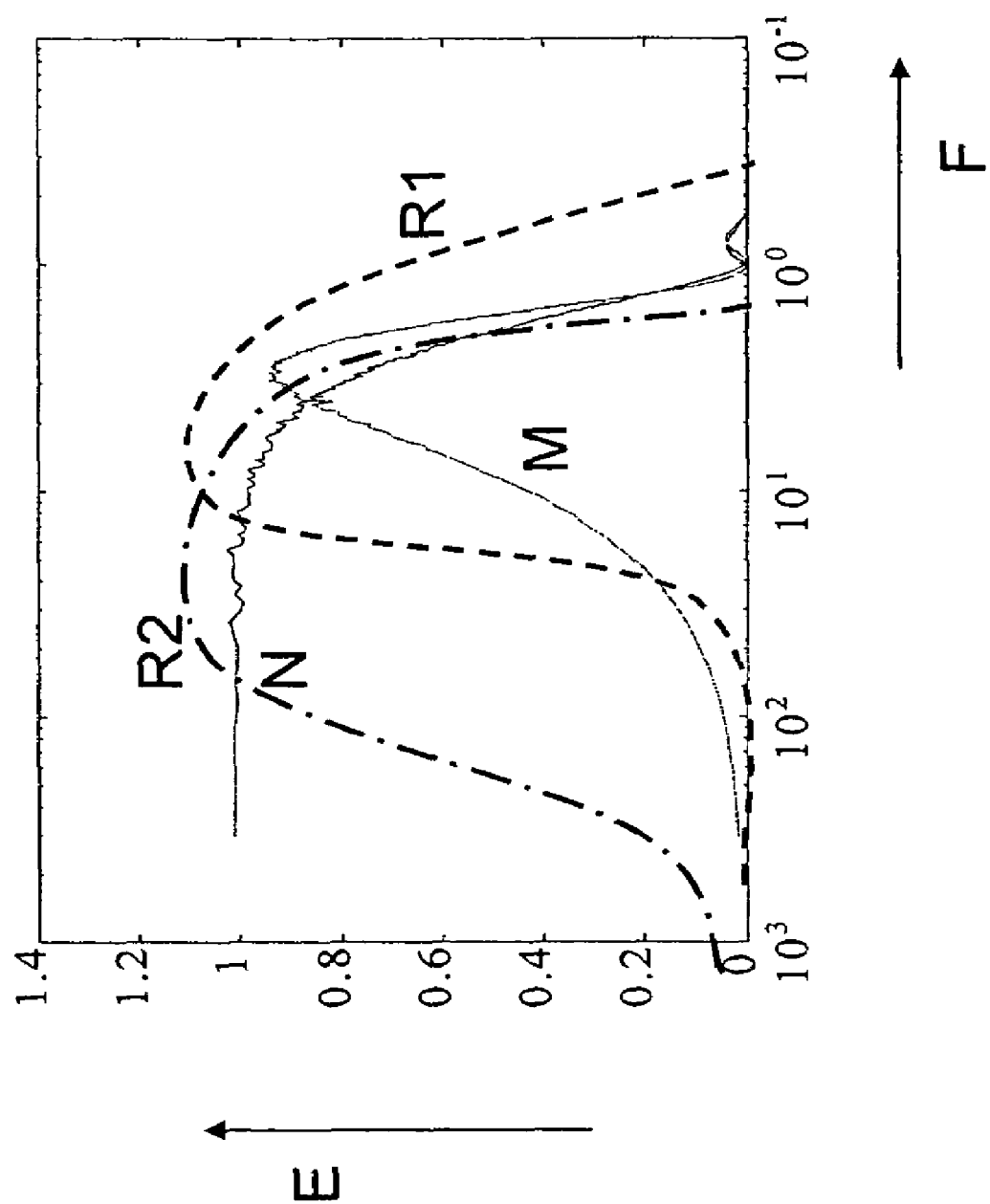
FIG. 6 is a timing diagram comparing the encoding of a prior art packet format with the serialized packet format according to the invention.

FIG. 6 shows a spectral power characteristics diagram illustrating adaptation of the receiver characteristics for non-return to zero encoded signals and Manchester encoded signals illustrated by the right-arrow labeled F. The x-axis of the diagram is the normalized frequency. The y-axis of the diagram is the spectral power illustrated by the up-arrow labeled E. The characteristic for non-return to zero encoding is labeled N and the characteristic for Manchester encoding is labeled N. There are also two receiver spectral characteristics shown, a first receiver characteristic R1 optimized for Manchester encoded data and a second characteristic R2 optimized for non-return to zero encoding.

Switching the transient time (or receiver characteristics) is compared to the bit rate rather a smooth transit. For it's implementation are not only sample and hold gates available but also gain controlled amplifiers etc.

Manchester coding and NRZ are only examples for codings. Instead of Manchester coding any other coding schema can be applied that produces a reasonable band gap at lower frequencies. Instead of pure NRZ code any other coding schema can be applied that results in a high channel utilization.

Although it is obvious to apply the Manchester coding part to the logical packet header and the NRZ part to the payload of the packet, but there is no special need for that kind of coupling. Both the border between Manchester coding and NRZ and the border between logical header and payload can be obviously defined independently.

In a more general view of the transmission of coded data problem a adaptable unified coding schema would be advantageous. In the proposition above there is a focus on the problems of the physical layer. An encoding depending on the pay load and on the transport requirements, i.e. quality of service parameters, the coding should be adaptable as illustrated for headers and the two types of payload. It is expected that the alignment of data presentation/encoding, e.g. video data in MPEG, audio data in phonemes, images in GIF etc., transmission network requirements, e.g. routable packets, identifiable headers, etc., transmission medium requirements, e.g. physical boundaries, medium properties, etc., and quality of service requirements, e.g. delay, delay jitter, maximum delay, etc. is expected to be advantageous than a de-coupled constant encoding.

What is claimed is:

1. A method for transmitting packets comprising a synchronization part and a payload part, the payload part comprising a first data sequence and a second data sequence, said method comprising:
    sending and encoding the first data sequence using a first encoding scheme;
    sending the synchronization part using the first encoding scheme;
    encoding and sending the payload part using a second encoding scheme on a sender side;
    receiving and decoding the first data sequence;
    detecting the synchronization part and synchronizing and adapting said receiving and decoding;
    receiving and decoding the second data sequence on a receiver side;
    sending a shortened synchronization part using the first encoding scheme, followed by sending the first data sequence using the first encoding scheme, followed by sending the second data sequence using the second encoding scheme instead on the sender side;
    detecting the shortened synchronization part;
    receiving and decoding the first data sequence;
    detecting the end of the first data sequence and synchronizing and adapting said receiving and decoding; and
    receiving and decoding the second data sequence on the receiver side,
    wherein the first encoding scheme is a line coding enabling the synchronization in the receiver.

2. The method according to claim 1, wherein the first data sequence is Manchester encoded and wherein the second data sequence is non-return-to-zero encoded.

3. The method according to claim 1, wherein said adapting and said decoding is dependent on the received signal pattern.

4. The method according to claim 1, wherein said adapting and said decoding is time dependent.

5. The method according to claim 1, wherein said second encoding comprises further encodings.

6. A sender for transmitting packets comprising a synchronization part and a payload part, said sender comprising:
    a serialization unit for serialization data; and
    an encoding unit for encoding said serialized data,
    wherein said serialization unit is adapted to generate the synchronization part using a first encoding scheme, followed by a first data sequence of the payload part using the first encoding scheme, followed by a second data sequence using a second encoding scheme,
    wherein the first encoding scheme is a line coding enabling a synchronization in a receiver.

7. An optical networking element for transmitting packets comprising a synchronization part and a payload part, said optical networking element comprising the sender according to claim 6.

8. A receiver for receiving packets comprising a synchronization part and a payload part, said receiver comprising:
    a detector unit for detecting the synchronization part encoded in a first encoding scheme;
    a control unit for adapting the receiver characteristics; and
    a decoder adapted to decode a first data sequence of the payload part, encoded in the first encoding scheme,
    wherein said detector unit is adapted to detect the end of said first data sequence, said control unit is adapted to adapt the decoder, and said decoder for decoding a second data sequence of the payload part, encoded in a second encoding scheme, and
    wherein the first encoding scheme is a line coding enabling a synchronization in the receiver.

9. An optical networking element for transmitting packets comprising a synchronization part and a payload part, said optical networking element comprising the receiver according to claim 8.

* * * * *